A. G. McADIE.
PLANT PROTECTOR.
APPLICATION FILED AUG. 16, 1909.

947,519.

Patented Jan. 25, 1910.

Witnesses:

Inventor
Alexander G. McAdie

UNITED STATES PATENT OFFICE.

ALEXANDER G. McADIE, OF SAN FRANCISCO, CALIFORNIA.

PLANT-PROTECTOR.

947,519.  Specification of Letters Patent.  Patented Jan. 25, 1910.

Application filed August 16, 1909. Serial No. 513,159.

(DEDICATED TO THE PUBLIC.)

*To all whom it may concern:*

Be it known that I, ALEXANDER G. McADIE, an employee of the Department of Agriculture of the United States of America, residing at San Francisco, California, whose post-office address is San Francisco, California, have invented a new and useful Improvement in a Plant-Protector for Fruit-Trees, Flowers, and other Plants from Frost.

This application is made under the act of March 3, 1883, chapter 143 (22 Stat., 625), and the invention herein described and claimed may be used by the Government of the United States or any of its officers or employees in the prosecution of work for the Government, or any person in the United States, without payment to me of any royalty thereon.

My invention relates to a cover for the protection of fruit trees, flowers, and other plants from frost, and I describe it as an anti-frost cover.

The object of my invention is to provide a cheap and inexpensive device for covering flowers, garden truck, and small fruit trees so as to prevent injury thereto from frost. The principle of my invention is to prevent heat loss to plants and fruit trees by radiation. In order to prevent such heat loss to plants and fruit trees, I employ in my invention a double cover made of suitable waterproof and weatherproof paper or cloth, with an intervening non-conducting air space. The purpose of this double cover with an intervening non-conducting air space is to prevent the escape of the long heat waves from the ground and thus retain the desired warmth within the tent for the benefit of the plants and fruit trees requiring protection. This object may be said to be perfectly accomplished by the use of my invention.

The nature, characteristic features, and scope of my invention will be more readily understood from the following description, taken in connection with the accompanying drawing, forming a part hereof, wherein—

Figure 1:
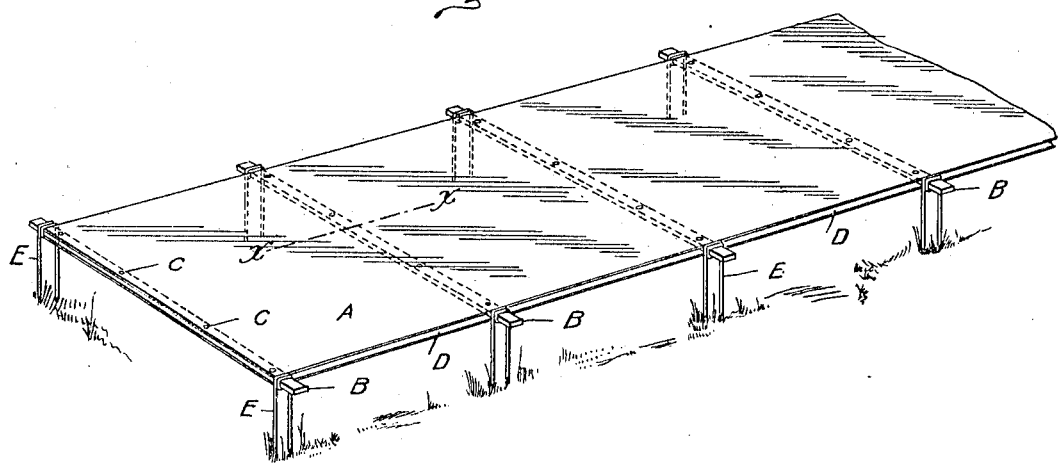
Figure 2:
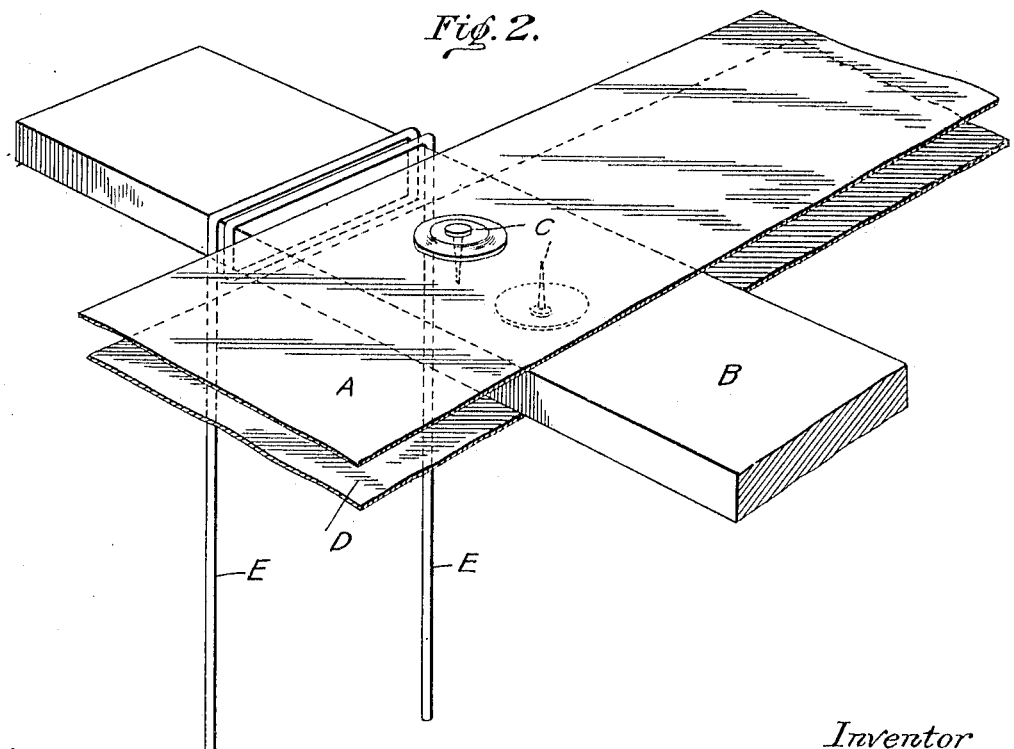

Figure 1, is a perspective view of my invention; and Fig. 2, is a detail view partly in section showing the intervening non-conducting air space.

Referring to the drawing, A represents the paper or tent covering which is preferably made of asphalt sheathing paper, such as is ordinarily used on the walls of buildings, of black color, and of waterproof quality. This asphalt sheathing paper is cut into strips of the desired length. Two of such strips, one placed over the other, are separated at intervals of four feet by laths, B. Therefore, in a strip twenty feet long, there will be six laths, one at each end and four at equal distances. The laths, B, run crosswise the length of the strip or covering, A. The paper or covering, A, is fastened to the laths, B, by ordinary tacks, C, and tin caps. The tacks, C, are driven on both sides of the paper or covering, A, into the laths, B, and if six-oz. tacks are used, there will be no danger of injury to the paper by the points.

I do not confine myself to the use of asphalt sheathing paper, but any desirable paper or cloth may be used for the purposes indicated. Furthermore, it may be sometimes more convenient and satisfactory to cement the laths and paper by using a cement or adhesive compound. When the two layers of paper are thus arranged, the same are separated by the thickness of a lath, viz., approximately one-quarter of an inch, thereby permitting an air space, D, of this thickness between the two layers of paper, as shown in Fig. 2. The laths, B, project several inches on either side of the paper covering, A, and bent galvanized wire staples, E, are looped around the projecting ends of the laths, B, and after the paper covering, A, is placed in the proper position for protecting the plants or fruit trees, the two ends of the wire staples, E, are placed in the ground, and the paper cover is thereby held firmly in place over the plant at the desired height above the ground.

My invention is constructed in rolls or long strips which can be easily carried. In practice, a roll or strip approximately one hundred feet long and three feet wide is carried to the bed intended to be covered, where it is unrolled and left in the desired position over night. When the plant protector is not in use, the wire staples, E, are removed, and the plant protector may be folded or rolled up so as to occupy but little space.

My invention is also adapted for the protection of fruit trees. In using the plant protector for protecting fruit trees, it is only necessary to unroll and spread one or more rolls of the covering under the tree intended to be protected, preferably before sunset, while the ground is moderately warm, and then remove such covering from under the tree about four o'clock in the morning. The purpose of using the covering in the manner indicated is to retain the earth's heat from the tree until such hour as it is most needed. When the covering is removed, the earth's heat being no longer intercepted, ascends to warm the foliage and fruit of the tree.

The use of serviceable material in my invention, weather-proof quality and of suitable color, serves to prevent loss of heat by slow conduction, and the formation of convectional air currents at the surface of the ground. Its use reduces to a minimum the loss of heat during the night hours, and also serves as a screen and non-conductor during the hour of sunrise to prevent a too rapid warming up of the ground and consequent injury to plant tissue resulting from such rapid heating.

Having thus described my invention, I claim:

1. A plant protector consisting of suitable waterproof paper, arranged in double layers and held between by a plurality of laths separated at intervals, an intervening air space between said layers for preventing the passage of heat, means for holding the said plant protector in a fixed position for retaining heat waves from the ground, and adapted to be folded and carried, substantially as specified.

2. A plant protector consisting of an outer layer of suitable waterproof cloth and an inner layer of waterproof cloth held between by a series of laths separated at intervals, an intervening air space between said outer and inner layers for intercepting the passage of heat, means for holding said protector in a fixed position for retaining heat waves from the ground, and adapted to be folded and carried, substantially as specified.

In testimony whereof, I affix my signature in the presence of two subscribing witnesses.

ALEXANDER G. McADIE.

Witnesses:
G. H. WILLSON,
W. J. REED.